US011814323B1

(12) United States Patent
 Apostolov (10) Patent No.: US 11,814,323 B1
(45) Date of Patent: Nov. 14, 2023

(54) HIGH TEMPERATURE COMPOSITE STRUCTURE AND SYSTEM FOR DETECTING DEGRADATION THEREOF

(71) Applicant: Government of the United States, as represented by the Secretary of the Air Force, Wright-Patterson AFB, OH (US)

(72) Inventor: Zlatomir D. Apostolov, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 193 days.

(21) Appl. No.: 17/223,339

(22) Filed: Apr. 6, 2021

Related U.S. Application Data

(62) Division of application No. 16/218,881, filed on Dec. 13, 2018, now Pat. No. 10,995,037.

(51) Int. Cl.
 *C04B 35/622* (2006.01)
 *C04B 111/94* (2006.01)

(52) U.S. Cl.
 CPC .. *C04B 35/62272* (2013.01); *C04B 35/62231* (2013.01); *C04B 2111/94* (2013.01); *C04B 2235/40* (2013.01); *C04B 2235/522* (2013.01); *C04B 2235/5248* (2013.01); *C04B 2235/5256* (2013.01); *C04B 2235/5288* (2013.01)

(58) Field of Classification Search
 CPC .................................................. C04B 2111/94
 See application file for complete search history.

(56) References Cited

U.S. PATENT DOCUMENTS

| 7,618,712 | B2 | 11/2009 | Sabol et al. |
|---|---|---|---|
| 8,752,432 | B2 | 6/2014 | Meitzler et al. |
| 8,981,796 | B2 | 3/2015 | Soar |
| 2005/0146076 | A1 | 7/2005 | Alexander et al. |
| 2011/0089958 | A1 | 4/2011 | Malecki et al. |
| 2015/0185128 | A1 | 7/2015 | Chang et al. |
| 2017/0132901 | A1 | 5/2017 | Ihn et al. |

FOREIGN PATENT DOCUMENTS

| CA | 2570117 | 1/2014 |
|---|---|---|
| CN | 108426919 A | 8/2018 |
| GB | 2180940 B | 9/1989 |
| JP | 2000321169 A | 11/2000 |

(Continued)

OTHER PUBLICATIONS

Ciang et al., "Structural health monitoring for a wind turbinesystem: a review of damage detection methods," 2008 Meas. Sci. Technol. 19 122001.

(Continued)

*Primary Examiner* — Khanh T Nguyen
(74) *Attorney, Agent, or Firm* — AFMCLO/JAZ; Matthew D. Fair (57) ABSTRACT

The present disclosure includes a system and method for monitoring degradation of a high temperature composite component (HTC). The HTC is defined by a volume that includes a matrix material and a fiber formed from at least one of ceramic and carbon material. One or more electrical conductors are disposed within the volume and connected directly or indirectly to a monitoring system.

12 Claims, 8 Drawing Sheets

(56) References Cited

FOREIGN PATENT DOCUMENTS

KR          101781687 B1    9/2017
WO          2013086626 A1   6/2013

OTHER PUBLICATIONS

Kessler et al., "Damage detection in composite materials usingLamb wave methods," 2002 Smart Mater. Struct. 11 269.
Masters et al., "Damage Detection in Composite Materials," ASTM, Aug. 1992.
Matsuzaki et al., "Wireless detection of internal delamination cracks in CFRPlaminates using oscillating frequency changes," Composites Science and Technology 66 (2006) 407-416.
Pandey et al., "Damage Detection From Changes in Curvaturemode Shapes," Journal of Sound and Vibration (1991) 145(2), 321-332.
Zhou et al. "Damage detection and assessment in fibre-reinforced composite structures with embedded fibre optic sensors—review," Smart Mater.Struct. 11 (2002) 925-939.
Zhou et al., "Damage detection and assessment in fibre reinforcedcomposite structures with embedded fibre optic sensors—review," 2002 Smart Mater. Struct. 11 925.
Zou, et al., "Vibration-Based Model-Dependent Damage(Delamination) Identification and Healthmonitoring for Composite Structures—a Review," Journal of Sound and Vibration (2000) 230 (2), 357-378.

HIGH TEMPERATURE COMPOSITE STRUCTURE AND SYSTEM FOR DETECTING DEGRADATION THEREOF

CROSS REFERENCE TO THE PRIORITY PATENT APPLICATION

This is a Divisional Patent Application of U.S. application Ser. No. 16/218,881 currently pending and filed on Dec. 13, 2018.

GOVERNMENT RIGHTS STATEMENT

The invention described herein may be manufactured and used by or for the Government of the United States for all governmental purposes without the payment of any royalty.

FIELD OF THE INVENTION

This invention relates to the field of high temperature ceramic or carbon composites. More particularly, this invention relates to detecting the structural integrity of components made from such materials.

BACKGROUND OF THE INVENTION

The manufacturing process for a high temperature composite (HTC) typically consists of (1) lay-up and fixation of the fibers, shaped as the desired component (as used herein, the term lay-up also includes a preform, as described in more detail hereafter), (2) infiltration of the matrix material, and (3) curing and firing of the HTC to drive off volatile compounds, leaving just the HTC material remaining, namely fiber and matrix, with the latter being ceramic or carbon-based. The first and second steps can be iteratively repeated by performing a partial cure after each fixation and infiltration of a fiber ply, then fixing, infiltrating and partially curing another ply, and so forth until the component is completed, and then firing the entire component.

In the first step, the fibers are arranged and fixed such as by lay-up of fabrics, winding, braiding, knotting, or by the formation of a three-dimensional preform. In the case of a preform, plies are stacked up and sequentially needled in the through-thickness direction to provide improved inter-laminar properties. Each of these layers is referred to as a ply herein. The end result of fixing a plurality of these plies is called a preform. Many different options are available for the second step of matrix formation, such as deposition out of a gas mixture, pyrolysis of an infiltrated pre-ceramic polymer, chemical reaction of molten metallic precursors, and electrophoretic deposition of a ceramic powder. These are usually followed by sintering and crystallization at temperatures of between about 1000° C. and 1700° C.

As used herein, the term high temperature composites (HTCs) refers to composites where both the fibers and the matrix are at least one of ceramic based and carbon based.

Such HTCs are used to form components that are deployed in extreme environments, such as high temperature, high stress, or high corrosion. Other types of composites, such as polymer matrix composites (PMCs), typically cannot survive for any reasonable length of time in these environments.

PMCs are also formed at much lower temperatures than HTCs, at less than about 500° C., whereas HTCs are generally fabricated at temperatures greater than about 1100° C. Thus, the materials and methods that are applicable to PMCs are not applicable to HTCs.

Because HTC components are exposed to such extreme environments, they need to be inspected at regular intervals to detect any structural degradation. In the absence of such inspections, a component might fail, leading to catastrophic damages. Some of the structural problems that can occur are spalling, cracking, chemical reaction, and erosion (ablation).

However, removing such a component from use to perform the inspection can be expensive and time consuming. Further, in some applications it can be useful to monitor any degradation of the component in real time, as it is being used.

What is needed, therefore, are structures and methods that tend to reduce the issues suggested above, at least in part.

SUMMARY OF THE INVENTION

These and other needs are met by a HTC having a volume that includes a matrix material of at least one of ceramic and carbon, fiber of at least one of ceramic and carbon, where the fiber is dispersed within the matrix material, and electrical conductors.

In some embodiments according to this aspect of the invention, the electrical conductors include electrically conductive surface coatings on a portion of the fibers. In some embodiments, the electrical conductors include metal wires disposed in a parallel orientation. In some embodiments, the electrical conductors include metal wires disposed in a grid orientation. In some embodiments, the electrical conductors include metal wires formed as staples buried at different depths of the HTC.

In some embodiments, portions of the electrical conductors extend outside of the volume. In some embodiments, the electrical conductors are wholly contained within the volume. In some embodiments, the electrical conductors include at least one of niobium, molybdenum, tantalum, tungsten, rhenium, titanium, vanadium, chromium, zirconium, hafnium, ruthenium, rhodium, osmium iridium, and platinum. In some embodiments, the HTC is at least one of a surface, structural, propulsion, and functional component of an aircraft that is exposed to an aggressive environment. In some embodiments, the fibers are plies of woven fibers. In some embodiments, the fibers are plies of nonwoven webs of fibers.

According to another aspect of the invention, there is described a HTC having a volume including a matrix material comprising at least one of ceramic and carbon. The matrix material has a first conductive portion and a second nonconductive portion, where the first portion and the second portion are substantially non-intermixed. The volume also includes fiber that includes at least one of ceramic and carbon, where the fiber is dispersed within the matrix material.

In some embodiments according to this aspect of the invention, the first portion is disposed in a same position throughout a depth of the volume, while in other embodiments, the first portion is disposed in multiple positions throughout a depth of the volume, where the first portion disposed at one position in the depth does not contact the first portion disposed in another position in the depth. In some embodiments, the first portion is comprised of the second portion plus conductive additives comprising at least one of refractory metallic particulate and electrically conductive carbon-based material having at least one of graphene and nanotubes. In some embodiments, the HTC comprises at least one of a surface, structural, propulsion, and functional component of an apparatus that is exposed to an aggressive environment. In some embodiments, the fiber comprises plies of woven fibers. In some embodiments, the fiber comprises plies of a nonwoven web of fibers.

According to another aspect of the invention there is described a method for monitoring degradation of a HTC component, where the HTC component as provided includes a volume of a matrix material that includes at least one of ceramic and carbon, and fiber that includes at least one of ceramic and carbon, where the fiber is dispersed within the matrix material. Electrical conductors are also included within the volume. Electrical properties of subsets of the electrical conductors are monitored, and a report is provided when the electrical properties of a given subset of the electrical conductors crosses a predetermined threshold. The HTC component is selectively remediated based on the report.

In various embodiments according to this aspect of the invention, the HTC is at least one of a surface, structural, propulsion, and functional component of an apparatus that is exposed to an aggressive environment.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION OF THE INVENTION

General Overview

According to various embodiments of the present invention, there is added an electrically conductive system to the lay-up, such as by modifying portions of the matrix to be electrically conductive or by adding electrically conductive structures to or between the plies. In some embodiments the electrically conductive system spans the entire ply in which it is formed, with a plurality of conductive members individually formed in or between a plurality of the plies.

In some embodiments the electrically conductive system can be monitored in-situ or ex-situ, and in other embodiments the electrically conductive system can only be monitored ex-situ.

Because the electrically conductive system is disposed at multiple layers through the component, the degree of cracking, abrasion, corrosion, and ablation (all generally referred to as wear herein) to the component can be monitored. Because the electrically conductive system extends, at least in some embodiments, across an entire ply in which it is disposed, the location and depth of such wear can be monitored.

Specific Embodiments

With reference now to the figures, various specific embodiments of the present invention are described.

Figure 1:
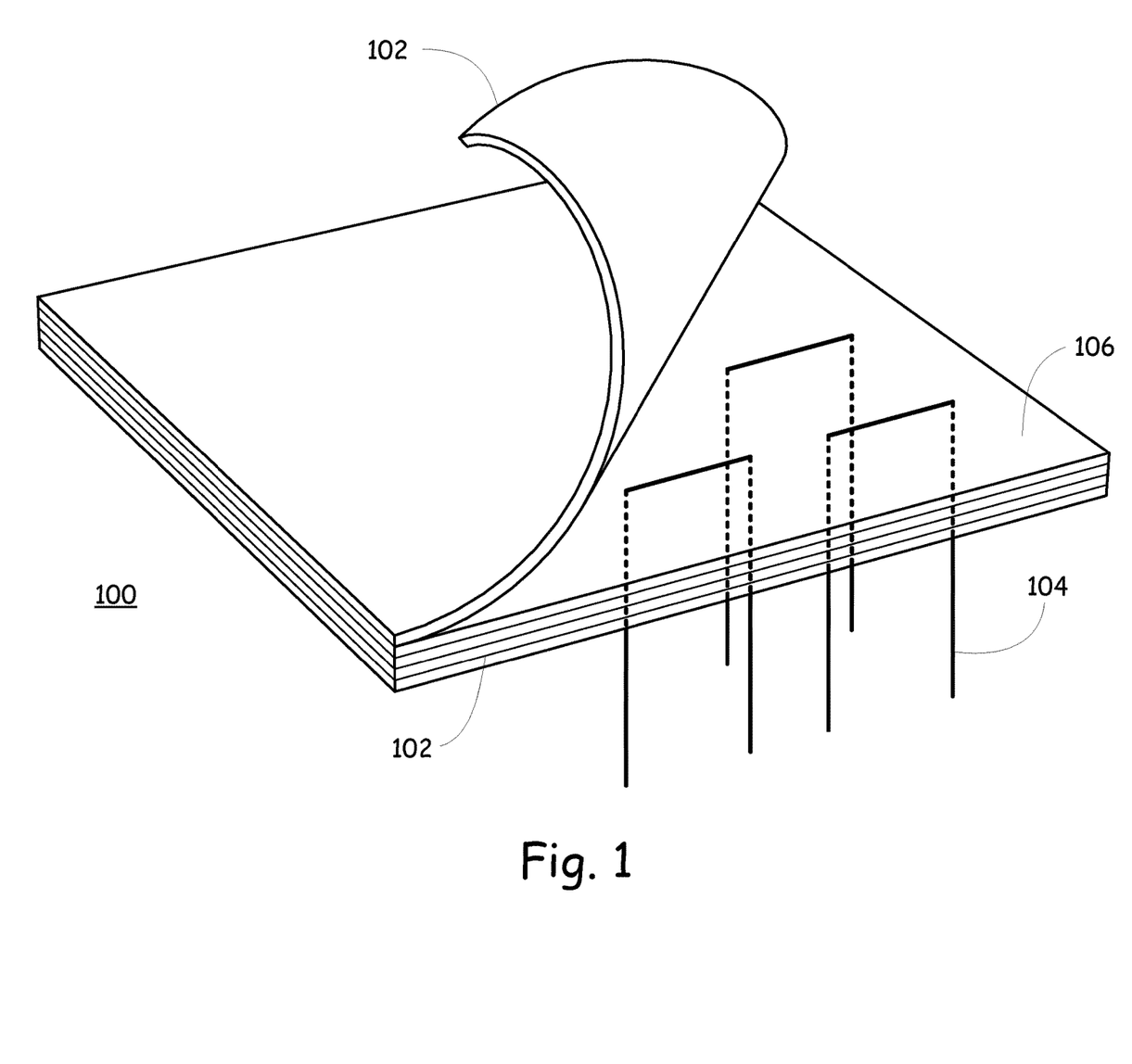
FIG. 1 is a perspective view of a HTC with electrical leads according to a first embodiment of the present invention.

FIG. 1 depicts a lay-up 100 according to an embodiment of the present invention, with five plies 102 that have been infiltrated with a matrix 106. FIG. 1 and the other figures are highly representational, in that they show a top-most ply 102 curled back so as to reveal the electrical conductors 104 that are disposed either within an underlying ply 102 or between two adjacent plies 102. The number of plies 102 in the lay-up 100 is representational only, and not limiting. So too the number, shape, location, and depth of the electrical conductors 104 as depicted is representational only and not limiting.

In the embodiment of FIG. 1, the electrical conductors 104 take the form of electrically conductive wires that come up through the bottom of the lay-up 100 to one or more of a plurality of different levels and positions, in a configuration that generally resembles a staple. By placing these staples in positions that cover the length, width, and depth of the lay-up—meaning from side to side, front to back, and between all of the plies 102, the position and depth of any wear that the lay-up 100 might incur can be monitored.

For example, the ends of the electrical conductors 104 can be connected to an instrument such as a conductivity meter, and the conductivity of each of the individual conductors 104 can be monitored. A crack in one position of the lay-up 100 will tend to sever an electrical conductor 104 that is disposed in that position, and the associated loss of conductivity through the electrical conductors 104 will be detected by the instrument, and can be reported to a controller, such as an on-board computer. Thus, the computer can track the position and depth of wear within a given component of the apparatus (aircraft, vehicle, etc.) that is constructed in this manner.

In a similar manner, as plies 102 are ablated away from the component due to heat, friction, corrosion and other factors, electrical conductors 104 will start to become open circuits at levels that are deeper and deeper within the lay-up 100, and in this manner the computer can monitor the rate at which wear is occurring within the lay-up 100. Thus, both the position and the depth of wear can be monitored in-situ or ex-situ.

Figure 2:
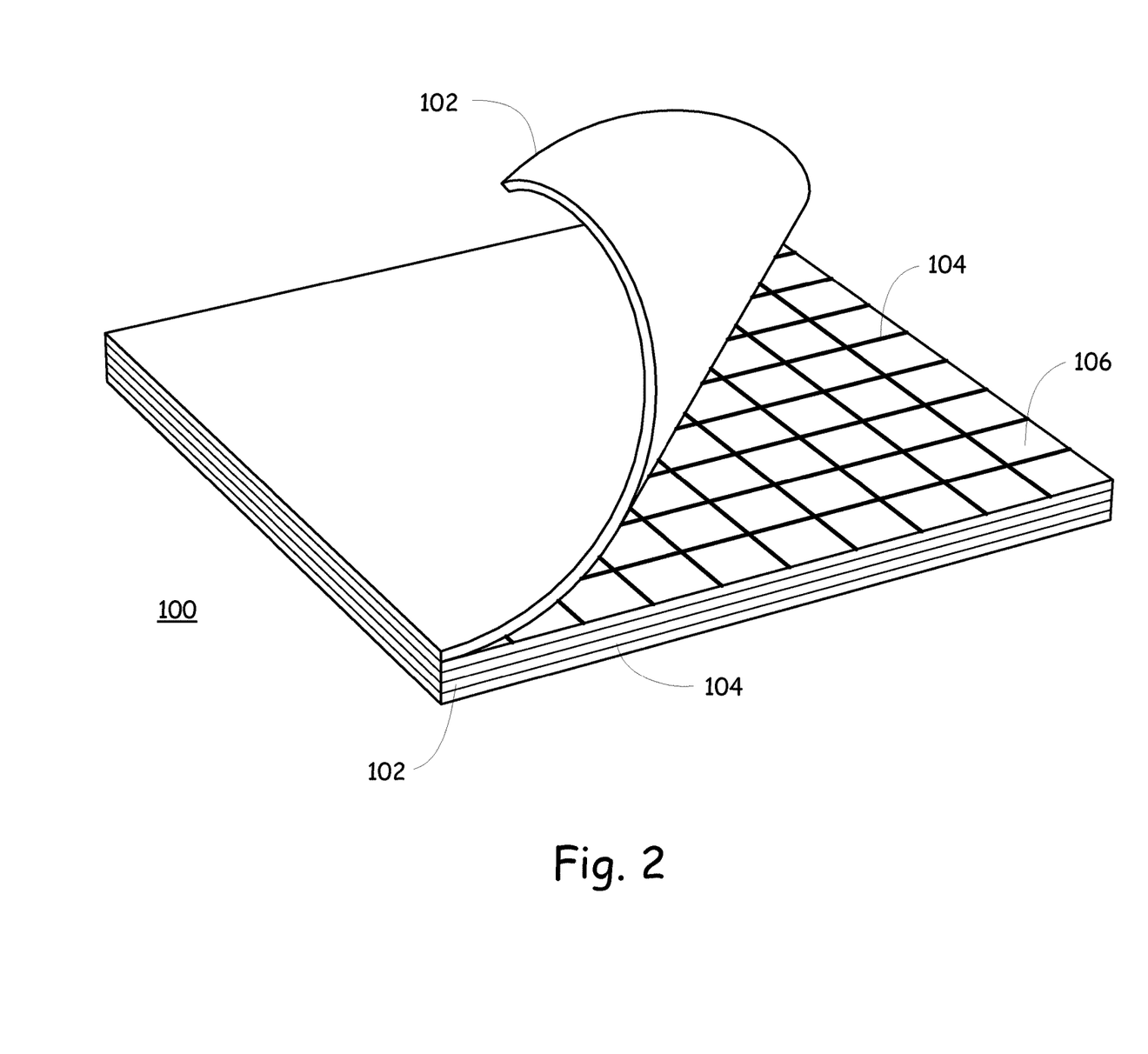
FIG. 2 is a perspective view of a HTC with electrical leads according to a second embodiment of the present invention.

FIG. 2 provides a depiction of a different structure for the electrical conductors 104, in which they form an array of crossing electrical leads that are disposed either within or between various layers of the plies 102. In some embodiments, the wires forming the electrical conductors 104 extend to the edge of the lay-up 100, and are electrically connected to an instrument, such as a conductivity meter as described above. In some embodiments the lateral positions of the wires of the electrical conductors 104 are offset from one layer to the next, so as to provide more finely resolved position information as electrical conductors 104 are damaged and reported as open circuits.

Figure 3A:
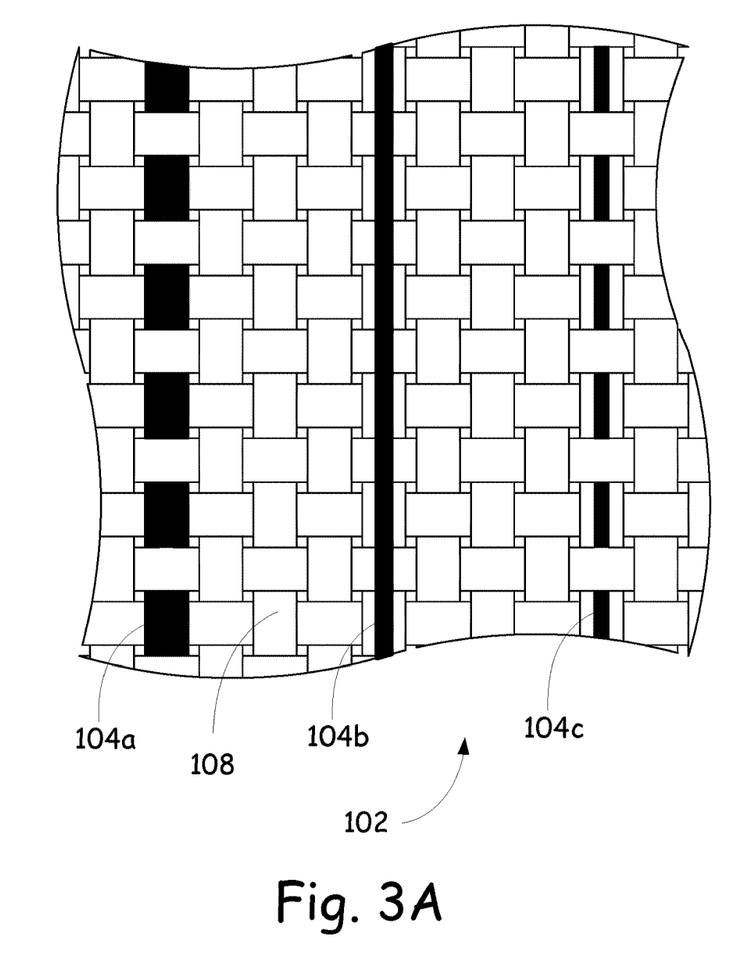
FIGS. 3A and 3B are views of a HTC with electrical leads according to a third embodiment of the present invention.
Figure 3B:
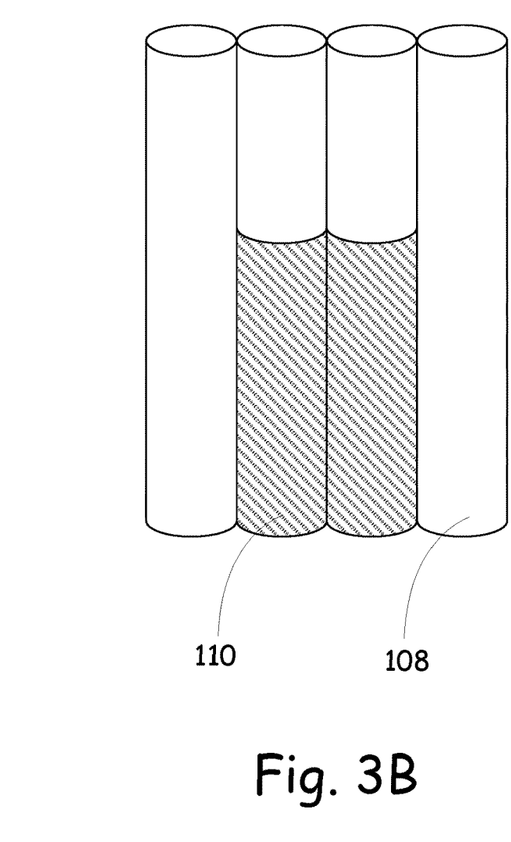

FIGS. 3A and 3B depict various ways in which the electrical conductors 104 can be formed or disposed within a ply 102. In FIG. 3A, electrical conductor 104a is a modified fiber or fiber tow 108 (as described in regard to FIG. 3B), electrical conductor 104b is laid on top of the ply 102, and electrical conductor 104c is woven into the ply 102. Alternately, electrical conductor 104a can replace a fiber 108. In FIG. 3B, the surface of a fiber 108 of the ply 102 has received a modification that causes a portion 110 of the fiber 108 to be electrically conductive. This can be accomplished with the use of a surface treatment, such as a metallic coating, or by some other means. Either just a portion of or the entirety of the fiber 108 can have the surface modification 110.

Figure 4:
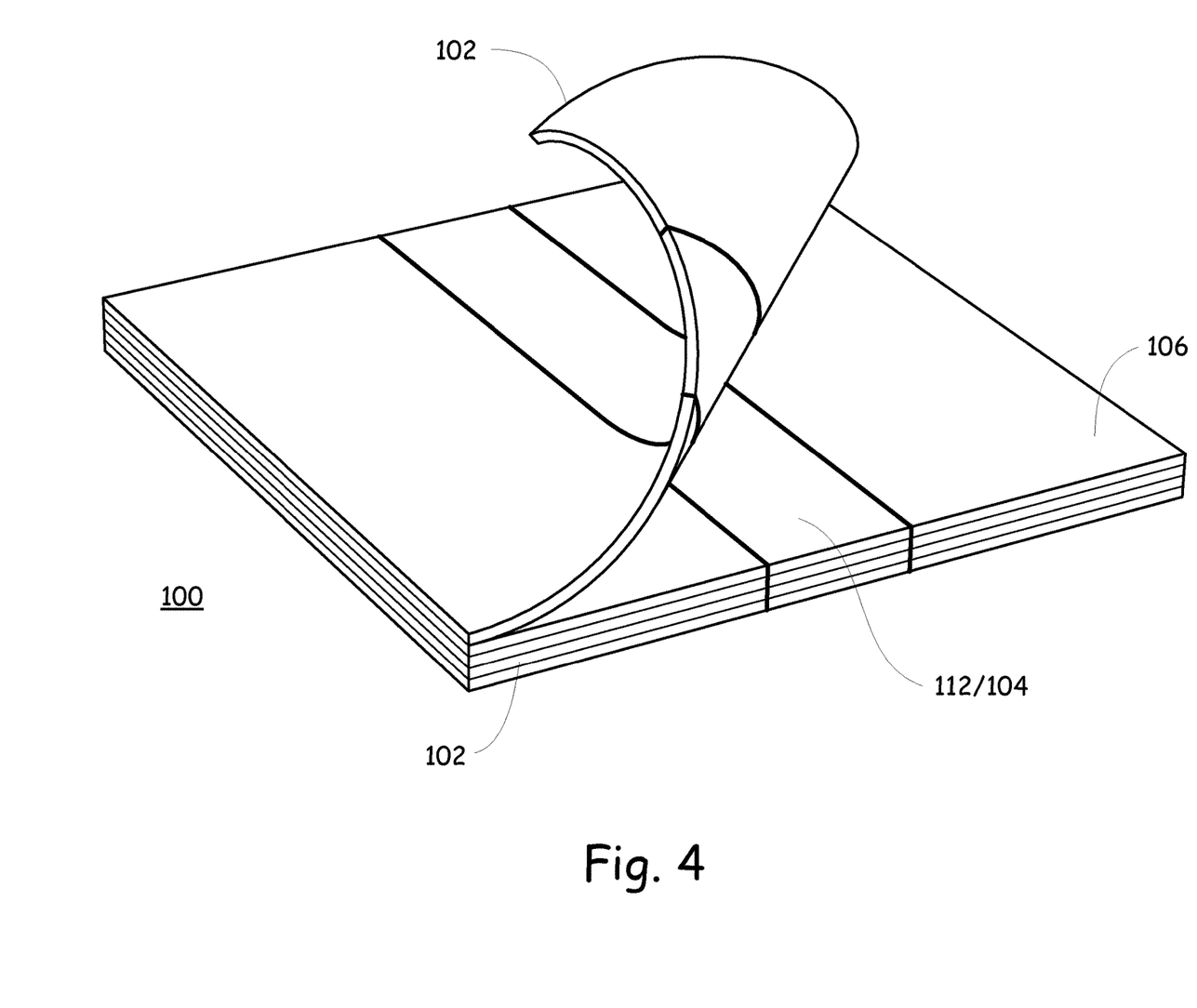
FIG. 4 is a perspective view of a HTC with an electrically conductive portion according to a fourth embodiment of the present invention.

FIG. 4 depicts an embodiment where a portion 112 of the matrix 106 is modified to be electrically conductive, such as by adding an electrically conductive component to the material of the matrix 106. In the embodiment depicted in FIG. 4, the electrically conductive portion 112 of the matrix 106 is infiltrated down through all of the plies 102 in the lay-up 100. In this embodiment, the degree and position of wear can be detected by monitoring the reduction of electrical conductivity within a given strip of the modified portion 112. Thus, the portion 112 serves as the electrical conductors 104.

Figure 5:
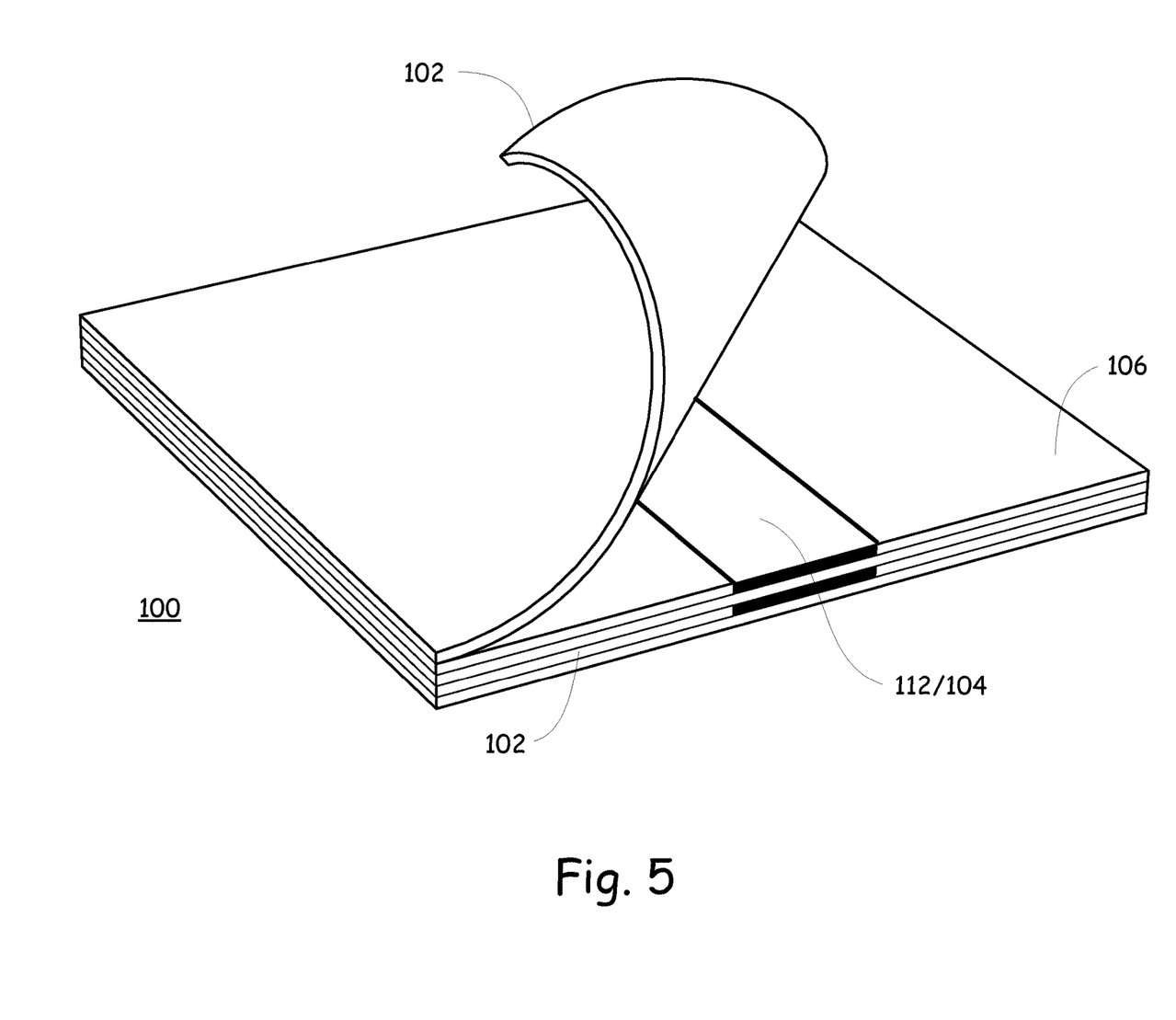
FIG. 5 is a perspective view of a HTC with electrically conductive portions according to a fifth embodiment of the present invention.
Figure 6:
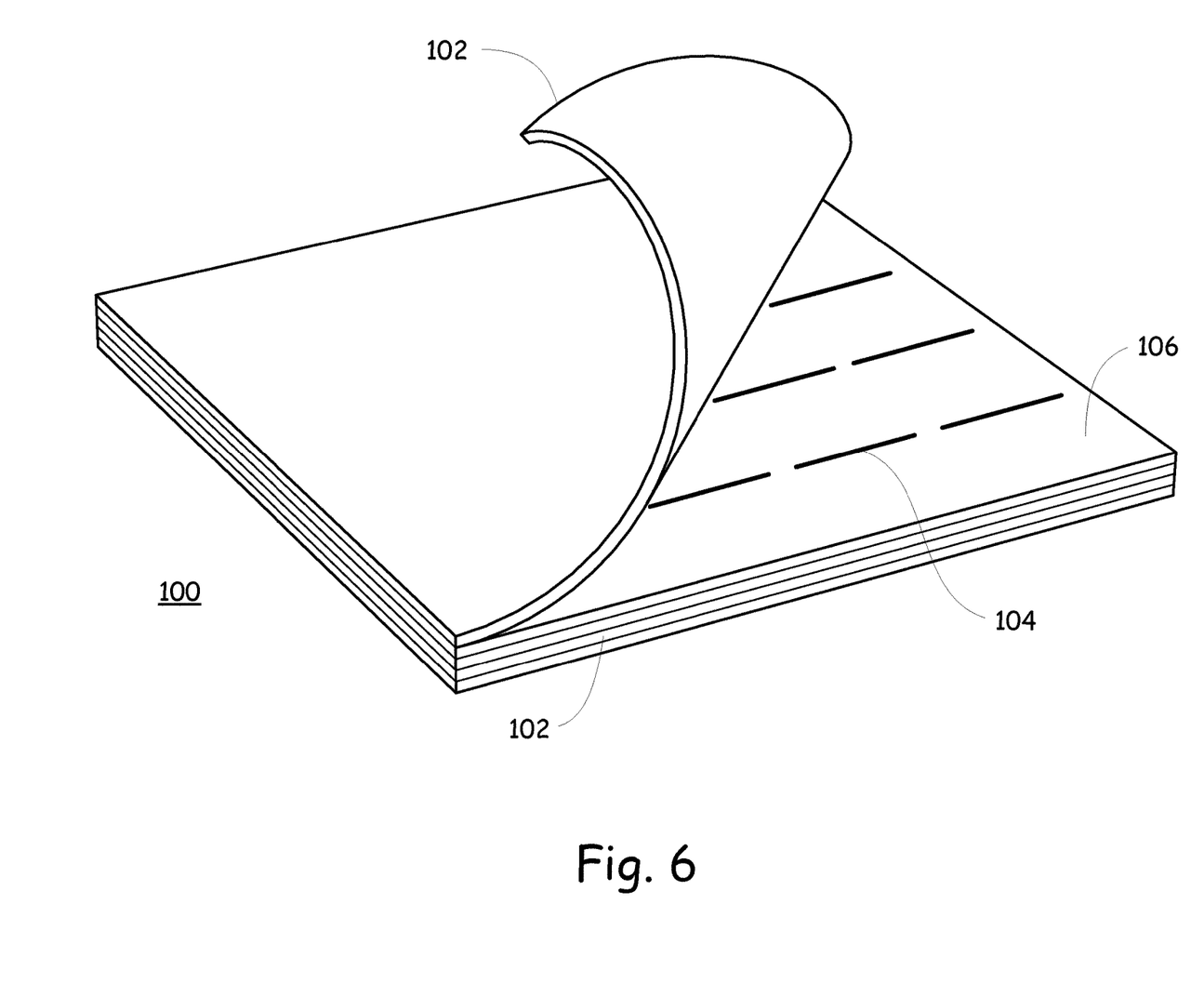
FIG. 6 is a perspective view of a HTC with embedded electrically conductive structures according to a sixth embodiment of the present invention.

In the embodiment of FIG. 5, the electrically conductive portion 112 is only disposed on or in some of the plies 102, such as every other ply 102. In this embodiment, the degree and position of wear can be detected by monitoring both the loss and reduction of electrical conductivity within the strips of the modified electrically conductive portion 112 that serve as the electrical conductors 104 at different depths within the lay-up 100. It is appreciated that the width and number of the modified portions 112 as depicted in FIGS. 5 and 6 is representational and not limiting. These embodiments can be monitored either in-situ or ex-situ.

FIG. 6 depicts an embodiment where the electrical conductors 104, such as wires, are disposed within or between various ones of the plies 102, but are not connected one to another, and which in some embodiments do not extend outside of the internal portions of the lay-up 100. In this embodiment the wear that might be sustained by a given electrical conductor 104 can be detected such as with an eddy current meter, or some other inductive device. This embodiment can also provide both in-situ and ex-situ monitoring, but in some embodiments it is better suited for ex-situ monitoring.

Figure 7:
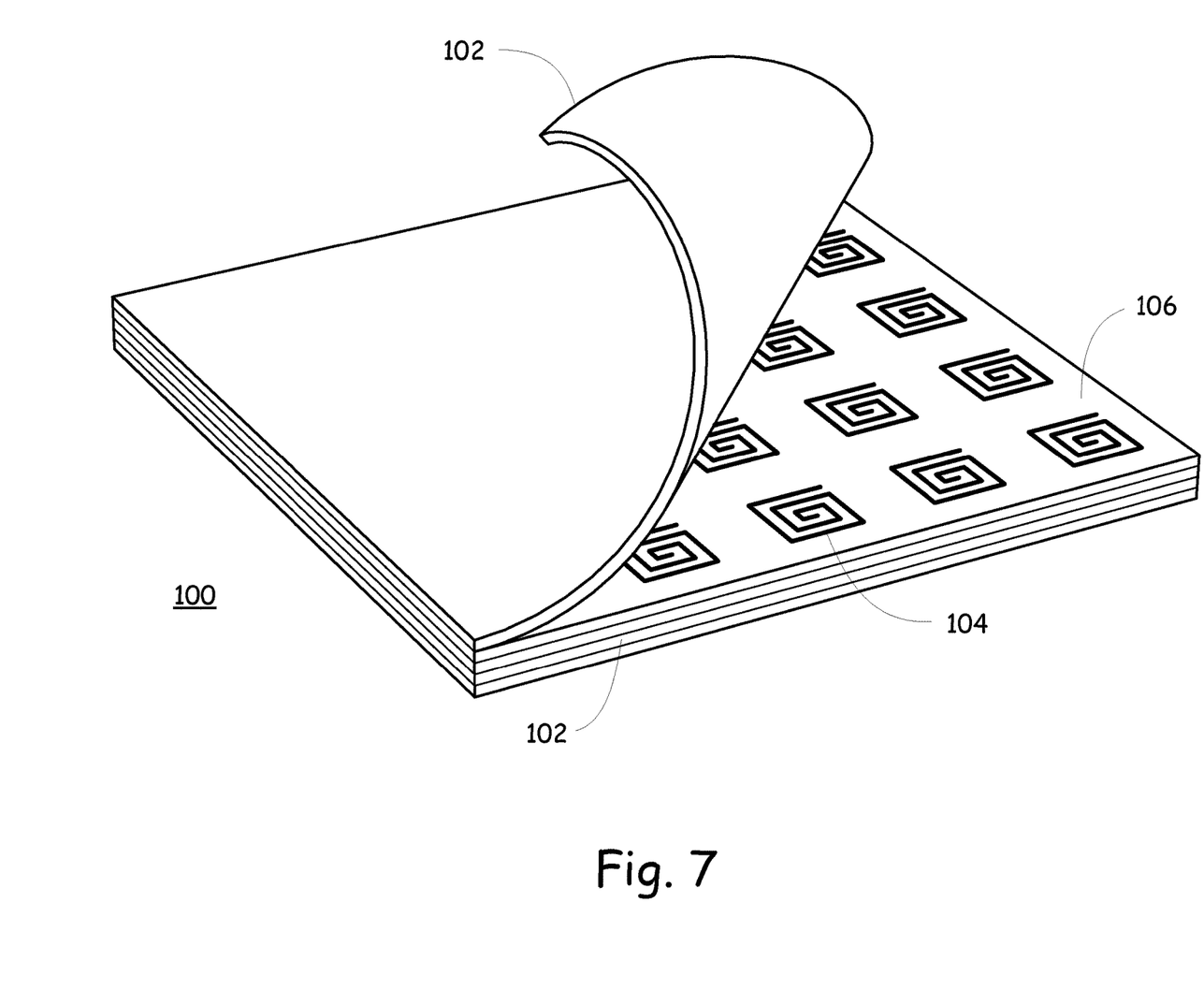
FIG. 7 is a perspective view of a HTC with embedded electrically conductive structures according to a seventh embodiment of the present invention.

FIG. 7 depicts another embodiment, similar to that as described in regard to FIG. 6 above, but where the electrical conductors 104 are formed with a shape that provides passive RF signaling, and thus can be monitored using radio frequency means either in-situ or ex-situ. Currently, no embedded RF capability exists for HTCs, and therefore this embodiment can provide a unique pattern-based signature for both inspection and communication purposes.

The characteristics of any such antenna design would depend upon the vehicle type and mission goals, but in one embodiment would be targeted towards long range and very long range trajectories, which are generally covered by a frequency range of from about 300 MHz to about 30 GHz. These in turn correspond to wavelengths of from about one centimeter to about one meter, typically using antenna elements (electrical conductors 104) with dimensions that are from about two to about four times smaller, which is very reasonable to accomplish through the proposed embodiment.

The location and shape of the electrical conductors 104 would also be vehicle and mission dependent, but since the proposed method does not constrain or modify established manufacturing practices, it allows significant flexibility to integrate the antenna (electrical conductors 104) at whatever locations are deemed appropriate. Connectivity of the embedded element (electrical conductors 104) to the receiver located in the vehicle interior can be achieved by an additional through-thickness conductor as described elsewhere herein, which can be part of the initial antenna structure, or added subsequently during the composite lay-up, but before solidification of the matrix material of the composite.

From a non-operational maintenance perspective, a different kind of embedded antenna (electrical conductors 104) can also be used for radio frequency identification, and more specifically as a passive RFID tag to identify individual components of the larger composite structure. To avoid complicating the system architecture, and because these types of readouts can be done in ambient environments, the antenna and the integrated circuit linked to it can be placed away from critical structural areas, while still being easily accessible in a maintenance depot environment, for example. The choice of passive instead of active RFID further simplifies the design and integration method. One embodiment could be intended for a frequency range of about 10 MHz to about 15 MHz, with a readout distance of from about 1 m to about 2 m.

Figure 8:
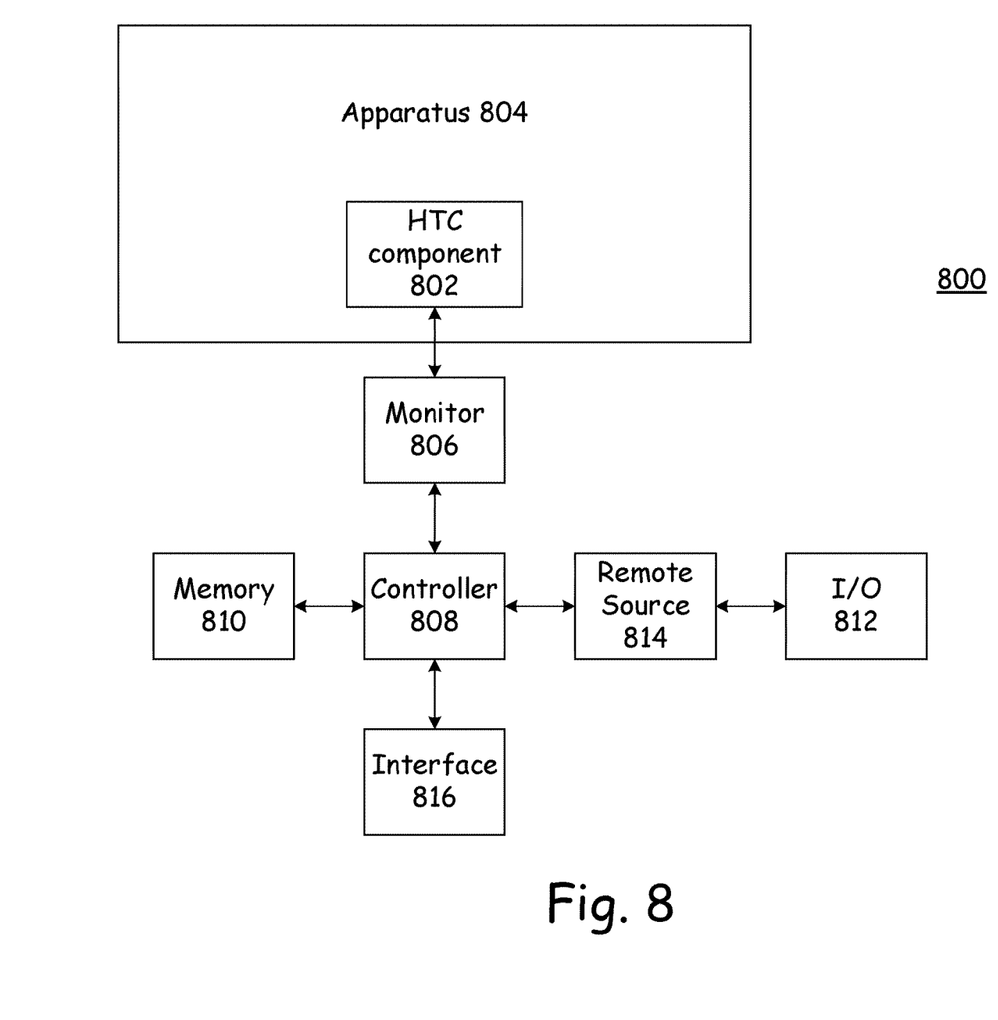
FIG. 8 is a functional block diagram of an apparatus that uses an HTC according to an embodiment of the present invention.

With reference now to FIG. 8, there is depicted a functional block diagram of a system 800 that can be used to monitor and report on the condition of an HTC component 802. The HTC component 802 is formed according to one or more of the embodiments described above, and is put into service in an apparatus 804, such as an aircraft or vehicle as generally described herein. Although the component 802 can be used for any part of the apparatus 804, it is particularly well-suited for a part that is exposed to an extreme environment, such as discussed elsewhere herein.

In various embodiments, the integrity of the component 802 can be monitored by a monitor 806 either while the apparatus 804 is in use (in situ) or when the apparatus 804 is not in use (ex situ). In various embodiments the monitor 806 takes many different forms, such as an eddy current meter, RFID reader, or resistometer. In some embodiments the monitor 806 is directly wired to portions of the electrical conductors 104 that extend outside of the volume of the HTCs component 802, and in other embodiments the monitor 806 is able to sense the extent of any damage to the electrical conductors 104 wirelessly, both as described elsewhere herein.

In some embodiments the monitor 806 is under the control of or provides readings to a controller 808, such as a computer. In some embodiments the controller 808 has the monitor 806 scan the entire component 802, and in other embodiments the controller 808 has the monitor 806 scan only portions of the component 802, such as if quickly-evolving damage is occurring to those portions of the component 802. In some embodiments the controller 808 has the monitor 806 inspect the component 802 in predetermined locations at predetermine intervals.

In some embodiments the readings gathered by the monitor 806 are stored in a memory 810 and can be sent to a remote source 814 such as via input/output 812, which in some embodiments is operable to receive instructions from the remote source 814 and apply them to the controller 808. In some embodiments the controller 808 analyzes readings from the monitor 806, such as by comparing them to predetermined values stored in the memory 810. If the readings do not favorably compare to the stored values, then the controller 808 can send a report, such as signaling an alarm, either through an interface 816 or to the remote source 814 through the I/O 812. In some embodiments the remote source 814 makes such comparisons.

Additional Descriptions

Various embodiments of the present invention integrate electrical conductors 104, such as refractory metal wires or other high-temperature materials, within the structure of a HTC. This ensures that the electrical conductors 104 survive the fabrication of the HTC, retains its signal generation and transmission capabilities, and does not negatively affect the properties of the HTC.

In this manner, users will be able to more accurately evaluate the in-situ in-flight state of the components made out of the HTCs. This will lead to a more accurate estimation of the lifetime of the component with respect to the remaining flight path, and an ability to optimize its performance based on knowledge of the component's status. This can have a direct influence on the survivability of the entire aircraft (as, for example, hypersonic platforms are often critically dependent on certain hot-structure components), and ultimately impact the mission outcome.

Potential commercial uses of the invention include various applications within the aerospace industry, such as vehicle outer shells, leading edges, high or low acreage thermal protection systems, engine components, exhausts, hot flow-path components, missile cones, and so forth, and the power generation industry, such as land-based gas turbines, and nuclear power generation.

In various embodiments, the invention is incorporated into any high-temperature ceramic or carbon-based HTC material component, and is therefore widely applicable. The design can vary according to the geometry, complexity, composition, expected environment severity, operational rigor, and degree of required awareness for the component.

The teachings of the present disclosure provide means, methods and systems for providing an awareness of the structural and compositional state of HTC-based components, before, during and after exposure to aggressive environments. It addresses the problem of uncertain component lifetime in environments that are extremely difficult and expensive to replicate in laboratory or industrial conditions. It provides real-time structural performance information for the component, which can be used to optimize the behavior of the supported overall structure. It also allows a means of evaluating the quality of as-processed HTC components, as well as their state after operational exposure.

Various applications include, but wouldn't be limited to, outer body shells of hypersonic vehicles (especially hot surfaces), internal hot sections of hypersonic vehicles (scramjet/ramjet engines, intake ducts, flow-path components, and so forth), conventional turbine engine components, land-based power generators, smelting operations, and generally any application that requires structural and compositional performance in high temperatures and aggressive chemical environments.

One embodiment includes integration of electrical conductors 104 of refractory metal wires within the HTC, and more specifically between (or within) the plies 102 of ceramic fiber weave for a two-dimensional lay-up 100. There are various wire geometries and integration approaches possible, with two of the less complex ones shown in the figures. As the HTC component encounters a highly aggressive environment (such as atmospheric re-entry, atmospheric flight at hypersonic or near-hypersonic speeds, turbine or scramjet/ramjet combustion environments, and so forth), the outer HTC plies 102 are worn away, which subsequently leads to the degradation and destruction of the electrical conductors 104. The interruption of each layer of the electrical conductors 104 is detected by the changes in the signals that they carry, and therefore provide a measure of detectable progress of the erosion front, and from there an estimate on the state of the component.

Another embodiment includes modified native phases of one or more components of the HTC, such as the matrix 106, fibers 108, or fiber coatings 110, instead of the introduction of an entirely new phase (the metal wires as described above). These modifications result in areas of the matrix 106, fiber 108, or fiber coating 110 that have properties that are different than those of the surrounding environment (higher electrical conductivity, for example). In this manner, components of the HTC itself serve as the sensors. As before, the sequential degradation of these selectively-modified HTC regions leads to interruption of the signal going through them, thus providing an ability to track the progress of the erosion front.

Yet another embodiment of the invention includes layers of electrical conductors 104 that are placed between each ply 102 of the HTC, resulting in a multi-layered sandwich-type structure, albeit with a miniscule proportion of metallic content.

The wire integration can be completed either before infiltration of the preform (however the preform is shaped), or after individual layers have been infiltrated (and if desired, B-staged), but before cure and solidification of the preform into a solid green body. The electrical conductors 104 can be placed manually or by automated means, and if small enough, even co-weaved within a fiber fabric 102. Additionally, the electrical conductors 104 can be modified (by coatings, for example), either to enhance the signal propagation, or to prevent them from reacting with the native HTCs phases, thus avoiding the formation of unwanted phases and degrading the sensory network performance.

The geometry of the electrical conductors 104 can be selected to best fit the component shape, mission requirements and environment, required density of coverage, cost-efficiency, and so forth. The electrical conductors 104 are located in one embodiment between each individual ply 102 of the HTC and, context depending, the electrical conductors 104 might also be highly localized or more irregularly distributed. In one embodiment, the electrical conductors 104 extend outside the confines of the component to allow attachment to an appropriate readout device (for electrical current, for example).

Generally, refractory types of metals are selected as the electrical conductors 104. Because of this and inert atmosphere processing, softening and oxidation during co-processing with the HTC are not a problem. Rather, it is the possibility of reaction between the metal of the electrical conductors 104 and one or more of the native phases forming unwanted compounds and degrading the performance of the electrical conductors 104 and the HTC itself. As mentioned earlier, one way to avoid this is to coat the electrical conductors 104 with a compound with which they are relatively stable. Another approach is to apply this method to HTCs that use native phases that are non-reactive with the chosen metal.

The native phase modification can be achieved in several ways, depending on the phase chosen for modification. If the matrix 106 is selected, this can be obtained by modifying the polymer (or using an entirely different polymer) used to create the matrix 106, and selectively infiltrating a small continuous volume of the two-dimensional fiber preform, for example a thin strip along the length of the fabric 102. After this pseudo-infiltration, each individual, partially-infiltrated ply 102 is cured, then the infiltration is repeated with the non-modified polymer, this time filling the rest of the fabric 102 in that same manner. This can be done individually to each ply 102, or cumulatively if the whole lay-up 100 is infiltration at once. After cure, the resulting green HTC will have a pre-determined matrix volume content 112 with properties that are different from the rest of the matrix 106. In this case, separate leads can be connected to the modified areas 112 of the lay-up 100 in order to connect them to the appropriate read-out device.

If the fiber 108 is selected for modification, then this can be achieved by selectively applying a thin coating 110 over the already present fiber 108 coating (if any), on a portion of the fibers 108 present in the fiber weave 102. The coating 110 may be applied by any conventional deposition method, or as a slurry containing a phase with the desired characteristics. Regardless of which coating method is chosen, it is performed on the bare fabric 108, or on the fibers themselves before they are woven into a fabric, prior to infiltration so that the modified coating 110 is fully deposited before the matrix 106 formation process is initiated.

After the new coat 110 is formed, the HTC processing continues along the traditional route. Similar to the previous modifications, the goal of this is to introduce a continuous phase within the volume of the HTC, this time running along the surface of the fiber weave, with properties different than those of the native constituents. Here, the fibers 108 coated with the modified composition 110 extend beyond the edges of the component so as to allow their connection to the respective read-out device.

Thus, the process is designed so that the newly-integrated or modified native phase retains through the HTC processing the properties that make it unique with respect to the surrounding environment, and the ability to transmit a signal. Additionally, no new, detrimental phases should be formed that affect the performance of the HTC (whether mechanical or environmental).

This problematic reactivity is potentially expected between the electrical conductors 104 and the native HTC phases 102 and 106. For example, the possibility of at least one of carbide and silicide formation between the refractory metal electrical conductors 104 (Nb, Mo, W, Re, Ha, Ta, Pt, Zr, Hf, and so forth) and a carbon or silicon rich matrix 106 might require the implementation of a barrier coating in some embodiments, to prevent this from occurring. The concern is similar if the native-phase modification route is taken—if there is a possibility of reaction between the native constituents and the newly-introduced polymer 112 or fiber coatings 110 (whether vapor or slurry deposited), measures specific to the materials selected are taken in some embodiments to prevent such reactions, in order to retain the desired properties of the electrical conductors 104.

The electrical conductors 104 can also be formed by other deposition methods, such as three-dimensional-printing a continuous conductive grid, for example. A protective, or property-enhancing coating on the separate phase can be formed by any conventional method — including without limitation plasma, electron beam, vapor, slurry, and electrophoretic. If a modified native phase, the modifications can be anything that changes the composition of the native phase, so that it acquires properties different than those of its native state. Modifying the matrix 106 forming polymer by adding solid particulates, mixing that polymer with one or more different polymers, using a completely different polymer, or using a native polymer with modified composition, are all variations of the basic approach.

If using reactive melt infiltration, a certain volume 112 of the preform can be of a composition that is different than the rest, so that upon infiltration with the liquid material, the required new phase can be formed only at these locations. The second aspect of the native-phase modification route (changing the fiber 108 or coating 110 of the matrix 106), can also be obtained by any of the conventional deposition methods.

The electrical conductors 104 geometry can be one-dimensional continuous (for direct readings), or discontinuous (for indirect readings such as induction-based measurements), two-dimensional and three-dimensional sensors, continuous or discontinuous, oriented through-thickness or parallel to the fiber weave direction, can also be integrated to provide additional functionality, or fit the geometry of a specific component or need. The native fiber composition can be carbon, refractory non-oxide or refractory oxide ceramic, and can be shaped in various orientations (1, 2, 2.5 or 3-dimensional geometries). The matrix 106 can be carbon, refractory non-oxide or oxide ceramic, and can be obtained by various processing methods. Polymer infiltration and pyrolysis, (reactive) melt infiltration, chemical vapor deposition, slurry-based infiltration, or any combination of these.

As long as it results in an integrated sensor network within the HTC component, the ordering of the sensor integration and HTC processing steps (sensor introduction, infiltration, cure, pyrolysis, and so forth) is not limited to a specific single sequence.

One use of the various embodiments according to the present invention is to detect structural and compositional degradation in HTCs that are subjected to extreme environments. However, the electrical conductors 104 can also be used for in-situ data collection from the component and its environment, ex-situ structural and compositional evaluation of HTC components, evaluation of processing and fabrication methods for HTCs, impact detection—localized and widespread, and signal reception and transmission.

Another embodiment of the invention involves variability in the forming of the metallic substructure. For certain applications (communications or directed energy protection, for example), more complex shapes and morphologies of the electrical conductors 104 might be desirable, that might not be achievable by using long, straight, wire-like elements. There are a variety of additive-manufacturing-based methods that can realize this, two examples being printing patterns with metallic-based inks, or selectively laser-sintering metallic powders in certain geometries onto the plies.

While fabric 102 consisting of woven ceramic fibers 108 is one optional means of reinforcement, the fibrous pre-form 100 can be in a variety of shapes and still accommodate the invention. For example, unidirectional tape layup is a fiber architecture-based processing method that is commonly used in the manufacturing of HTCs, and is very amenable to the incorporation of the electrical conductors 104 as proposed. Similarly, three-dimensional preforms that allow for the manufacture of considerably thicker HTCs are also amenable to the incorporation of the proposed invention.

Embodiment of the invention can also be implemented to allow ex-situ inspections of the HTCs, with the integration of the engineered metallic substructure, which permits non-contact (and non-destructive) inspection such as by electrical or magnetic means (such as an eddy current sensor), and to which pure ceramics or carbon composites are not susceptible. In this manner, the integrity of the electrical conductors 104 is inspected, and from there information about the state of the component around that phase (the rest of the HTC) is inferred. In one embodiment the electrical conductors 104 do not need to extend to the edges of the lay-up 100, but are distributed throughout the volume of the HTC. While the in-situ aspect may be useful from an operational perspective, the ex-situ option may be useful for long-term maintenance, and life-cycle considerations.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

Reference Number Index
100 Lay-up
102 Ply
104 Electrical conductor
106 Matrix
108 Fiber
110 Electrically conductive coating
112 Electrically conductive matrix

What is claimed is:

1. A method for monitoring degradation of a high temperature composite (HTC) component, the method comprising the steps of:
providing the HTC component formed in a plurality of layers, comprising a matrix material comprising at least one of ceramic and carbon, fiber comprising at least one of ceramic and carbon dispersed within the matrix material, and at least one electrical conductor extending between layers of the HTC,
monitoring electrical properties of the at least one electrical conductor,
transmitting a warning signal when the electrical properties of at least one of the at least one electrical conductor changes from an initial state.

2. The method of claim 1, further comprising selectively remediating the HTC component, based at least in part on the warning signal.

3. The method of claim 1, further comprising forming the at least one electrical conductor into a grid pattern.

4. The method of claim 1, further comprising positioning the at least one electrical conductor within one layer of the HTC.

5. A method for monitoring degradation of a high temperature composite (HTC) component, the method comprising the steps of:
providing the HTC component, comprising an electrically conductive matrix material and fiber dispersed within the matrix material;
monitoring electrical properties of the electrically conductive matrix material;
transmitting a warning signal when the electrical properties of the matrix changes from an initial state;
wherein the monitoring includes collecting electromagnetic signals transmitted by the matrix material for a period of time after an initial degradation of the component has been determined and then provide a measure of detectable progress of the erosion front of the component.

6. The method of claim 5, further comprising selectively remediating the HTC component, based at least in part on the warning signal.

7. The method of claim 5, wherein the monitoring includes contact and non-contact devices.

8. The method of claim 5, wherein the monitoring includes sensing changes in voltage of the matrix due to changes in temperature of the HTC component.

9. A method comprising:
providing a high temperature composite (HTC) component with an electrically conductive matrix material having a metallic sensor positioned therewithin;
wherein the sensor includes a non-linear shape that provides a passive RF signal having a unique pattern-based signature for both inspection and communication purposes;
measuring electromagnetic signals of the sensor;
distinguishing a shape and state of the sensor based on a quality of the electromagnetic signal.

10. The method of claim 9, further comprising sensing changes in voltage of the sensor due to changes in temperature of the HTC component.

11. The method of claim 10, wherein the sensing includes contact and non-contact devices.

12. The method of claim 9, wherein the measuring includes collecting electromagnetic signals transmitted by the metallic sensor for a period of time after an initial degradation of the structure has been initiated.

* * * * *